United States Patent [19]

Giordano et al.

[11] Patent Number: 5,627,234
[45] Date of Patent: May 6, 1997

[54] HOT MELT ADHESIVE COMPOSITION FOR LABELS

[75] Inventors: Sergio Giordano, Peschiera Borromeo; Antonio Gurnari, Ravenna; Carla Parodi, Genoa; Giantommaso Viola, Cervia, all of Italy

[73] Assignee: Enichem Elastomeri S.r.l., Milan, Italy

[21] Appl. No.: 413,897

[22] Filed: Mar. 30, 1995

[30] Foreign Application Priority Data

May 20, 1994 [IT] Italy .................................. MI94A1022

[51] Int. Cl.$^6$ .................................................. C08L 53/02
[52] U.S. Cl. ........................... 525/89; 524/505; 524/274; 525/98
[58] Field of Search ........................ 525/89; 524/270, 524/505, 271, 274

[56] References Cited

U.S. PATENT DOCUMENTS 3,607,846  9/1971  Halsea ............................. 525/359.5
5,075,377  12/1991  Kawabuchi et al. ................. 525/89

FOREIGN PATENT DOCUMENTS 0404185  12/1990  European Pat. Off. .

*Primary Examiner*—Mark L. Warzel
*Attorney, Agent, or Firm*—Watson Cole Stevens Davis, P.L.L.C.

[57] ABSTRACT

A block copolymer composition is disclosed which derives from the copolymerization of a monoalkenyl-arene and a conjugated diene having from 4 to 5 carbon atoms, and comprising:

from 30% to 55% by weight, preferably from 34% to 50%, of non-coupled linear structures;

from 25% to 40% by weight, preferably from 30% to 35% by weight, of coupled linear structures;

from 20% to 40% by weight, preferably from 24% to 35% by weight, of branched structures.

The preparation of said composition and its use in the formulation of adhesive tapes and labels are disclosed as well.

19 Claims, No Drawings

HOT MELT ADHESIVE COMPOSITION FOR LABELS

The block copolymers are more and more widely used in adhesive compositions, above all due to their high cohesion strength and to their capability of undergoing crosslinking without chemical curing.

These block copolymers, like those disclosed in U.S. Pat. No. 3,239,478, mostly are linear or radial styrene-butadiene or styrene-isoprene block copolymers. The above said linear copolymers have styrene-butadiene-styrene or styrene-isoprene-styrene structures. The high cohesion strength of these styrene-diene block copolymers can mainly be attributed to their interlaced net-like structure resulting from domain formation.

However, a high cohesion strength is often an undesirable quality for certain applications.

For example, it is well known that in natural rubber or SBR-based adhesives, the tack is inversely proportional to the cohesion strength. In other terms, when a rubber is crosslinked, the cohesion strength increases, but tack decreases.

U.S. Pat. No. 4,096,203 discloses a process for controlling the cohesion strength of block copolymer based adhesive compositions. The above said process provides an end coupling, with a coupling efficiency comprised within the range of from 20 to 80%, by means of the use of coupling agents. However, the copolymer compositions which can be obtained from said process suffer from the drawback of displaying a poor heat stability.

A composition of copolymers was found now which overcomes the above said drawback. A novel process for preparing said composition was found as well.

In accordance therewith, the present invention relates to a block copolymer composition which derives from the copolymerization of a monoalkenyl-arene and a conjugated diene having from 4 to 5 carbon atoms, characterized in that it comprises:

from 30% to 55% by weight, preferably from 34% to 50%, of non-coupled linear structures;

from 25% to 40% by weight, preferably from 30% to 35% by weight, of coupled linear structures;

from 20% to 40% by weight, preferably from 24% to 35% by weight, of branched structures;

with the proviso that the total percent contents of said three components equates one hundred %.

Under "non-coupled linear structures" structures of AB type are meant.

Under "coupled linear structures", structures of $(AB)_n$—X, $(B_1$—A—$B_2)_n$—X, $(B_1TA$—$B_2)_n$—X types with n=2 are understood.

Under "branched structures", coupled structures of $(AB)_n$—X, $(B_1$—A—$B_2)_n$—X, $(B_1TA$—$B_2)_n$—X types with n≧3 are understood.

Furthermore, —A— stands for a poly-monoalkenyl-arenic block, —B— stands for a polydienic block, wherein $B_1$ and $B_2$ are the same, or different from each other, —T— is a random copolymeric segment formed by dienic and alkenyl-arenic monomeric units. The composition and length of the —T—copolymeric segment can be varied by means of the addition of such polar substances as ethers, amines, to the reaction system.

Finally, —X— stands for a coupling radical with a valency of "n".

The dienic monomer containing from 4 to 5 carbon atoms is selected from butadiene and isoprene.

The monoalkenyl-arene preferably is styrene. Other monoalkenyl-arenic monomers comprise α-methyl-styrene, t-butyl-styrene and other, variously alkylated, styrenes.

The weight average molecular weight of each block can be varied as desired according to well known techniques for those skilled in the art.

The block copolymer constituted by the monoalkenyl-arene preferably has a weight average molecular weight comprised within the range of 4000 to 60,000, preferably of from 5000 to 40,000, with the amount of monoalkenyl-arene being comprised within the range of from 8 to 40%, preferably of from 10 to 25%, by weight, based on the total weight of the block copolymer.

A further object of the present invention relates to the process for obtaining the copolymeric composition disclosed above.

It is well known that in order to perform the coupling of the copolymeric chains, difunctional or polyfunctional coupling agents are necessary.

These coupling agents contain at least two functional groups which are capable of interacting with the living polymer. Typical examples of these coupling agents are polyepoxides, polyisocyanates, polyaldehydes, polyimines, polyketones, polyesters, polyhalides, and the like.

According to as disclosed by U.S. Pat. No. 4,096,203, the coupling efficiency can be reduced by operating according to two routes:

(1) addition of an amount of coupling agent which is smaller than the necessary stoichiometric amount for a complete coupling of the polymers, and subsequent addition of a quenching agent (e.g., water, alcohol), in order to deactivate a portion of non-coupled active sites;

(2) partial addition of a quenching agent and subsequent addition of a coupling agent.

The process taught by U.S. Pat. No. 4,096,203 suffers from the drawback that according to it two steps, and namely, the addition of two different reactants, the coupling agent and the quenching agent, have to be controlled.

The present Applicant found now a more advantageous process, because the partial coupling and quenching can be carried out in one step only, by means of the addition of one single reactant.

In accordance therewith, the present invention relates to a process for preparing block copolymers comprising from 30% to 55% by weight, preferably from 34% to 50%, of non-coupled linear structures;

from 25% to 40% by weight, preferably from 30% to 35% by weight, of coupled linear structures;

from 20% to 40% by weight, preferably from 20% to 35% by weight, of branched structures, with the proviso that the total percent contents of said three components equates one hundred %, the above said process being carried out through the following steps:

(a) reacting a monoalkenyl-arene with a lithium derivative having the general formula R—Li, in which R is a hydrocarbyl radical selected from aliphatic, cycloaliphatic radicals of from 2 to 20 carbon atoms;

(b) reacting the resulting mixture from above (a) step with the conjugated diene;

(c) reacting the resulting mixture from above (b) step with a coupling agent in an essentially stoichiometric amount based on lithium, characterized in that the coupling agent of the (c) step is selected from monobromo-derivatives having the general formula R'—Br, in which R' is a monofunctional $C_1$–$C_{10}$ hydrocarbyl radical selected from alkyl, cycloalkyl and aryl radicals.

According to the preferred embodiment, R' is a $C_1$–$C_3$ alkyl radical, still more preferably R' is ethyl.

The process according to the present invention displays the advantage that the bromo derivative having the general formula R'—Br behaves both as a coupling agent and as a quenching agent and consequently a further quenching step using reactants of water and alcohol types is no longer required.

One could hypotesize, although such a hypothesis is still to be verified, that the above said brominated derivative on the one hand undergoes a normal reaction with lithium yielding LiBr; and, on the other hand, yields radical species which are capable of undergoing coupling with a consequent increase in molecular weight.

The block copolymers prepared according to the process of the present invention display a coupling efficiency which is comprised within the range of from 30% to 70%, preferably of from 40% to 65%.

Under "coupling efficiency", the ratio is meant of coupled polymer molecules to total number of coupled and non-coupled polymer molecules. The above said coupling efficiency can theoretically be determined from the amount of polyfunctional agent which is actually used, as compared to the necessary amount to obtain a complete coupling. Analytical methods, as gel permeation cromatography, are available as well, in order to determine the type and molecular weights of polymeric fractions.

The (a) step of the process consistes in causing the alkenyl-arene, preferably, styrene, to react with the organoalkyl-lithium derivative in an inert solvent, with a living polymer with simplified structure A—Li being formed. Other alkenyl-arenes which can be used to form the non-elastomeric thermoplastic block "A", are $\alpha$-methyl-styrene, t-butyl-styrene, and still other ring-alkylated styrenes and mixtures thereof.

The inert solvent can be an either aromatic or naphthenic hydrocarbon, for example benzene or cyclohexane, possibly modified by the presence of alkanes and alkenes, e.g., pentenes or pentanes. Examples of suitable solvents are n-pentane, n-hexane, isooctane, cyclohexane, toluene, benzene, xylene, and the like.

Examples of organo lithium derivative with formula R—Li are ethyl lithium, n-propyl lithium, isopropyl lithium, n-butyl lithium, sec-butyl lithium, t-butyl lithium, t-octyl lithium, decyl lithium. Said organo lithium derivative is preferably selected from n-butyl lithium and sec-butyl lithium. The concentration of alkyl lithium initiator can be modified in order to control the molecular weight. The concentration of the above said initiator is generally comprised within the range of from 0.25 to 50 mmol per 100 g of monomer, even if no limits exist on the use of larger amounts.

The temperature during the (a) step of the above said process is generally comprised within the range of from 0° to 100° C., generally of from 20° to 60° C., anyway such as to keep the monomers in the liquid phase.

When all aromatic vinyl monomer is nearly totally consumed (and the living polymer has an A—Li structure in which "A" indicates the block of polymerized monoalkenyl-arene), to the obtained solution from the (a) step the conjugated diene of from 4 to 5 carbon atoms is added [(b) step]. Said conjugated diene preferably is isoprene or butadiene. This step is carried out at a temperature which is nearly the same as of the (a) step.

When the monomer of dienic type is nearly totally consumed[therefore, at the end of the (b) step], the resulting polymer can have a block structure of A—B—Li type (in which "B" stands for that block which derives from the polymerization of the conjugated polydiene), or $B_1$—A—$B_2$—Li, or $B_1TA$—$B_2$—Li, in which "T" stands for a "tapered" polymer deriving from random polymerization of both monomers.

When also the (b) step is over, the polymeric solution is treated with the coupling agent having the general formula R'—Br at a temperature comprised within the range of from 40° to 120° C., preferably of from 70° to 110° C. Examples of compounds of formula R'—Br useable in the present invention are bromomethane, bromoethane and higher homologues, bromocyclohexane, bromobenzene and its alkyl derivatives. The (c) step is practically complete in a time comprised within the range of from 5 to 30 minutes.

The so obtained polymeric composition according to the present invention generally have an average molecular weight comprised within the range of from 100,000 to 300,000.

The non-coupled linear structures usually have a weight average molecular weight comprised within the range of from 40,000 to 150,000, the coupled linear structures of from 80,000 to 300,000, the branched structures of from 120,000 to 450,000.

The block copolymer produced according to the process of the present invention is recovered by operating according to techniques known for those skilled in the art. For example, the solution which contains the polymer is evaporated under reduced pressure, or is submitted to steam distillation.

The polymeric compositions according to the present invention are useful in adhesive compositions, in particular for adhesive labels.

A further object of the present invention is an adhesive composition for preparing adhesive tapes and labels, comprising a base polymer, one or more tackifier resins and, optionally, one or more antioxidants and a fluidifier resin and/or a fluidifier oil, characterized in that said base polymer is a composition of block copolymers deriving from the copolymerization of a monoalkenyl-arene and a conjugated diene having from 4 to 5 carbon atoms, the above said composition being essentially constituted by:
a) linear structure, non-coupled block copolymers in an amount comprised within the range of from 30% to 55% by weight, preferably of from 34% to 50% by weight;
b) linear structure, coupled block copolymers in an amount comprised within the range of from 25% to 40% by weight, preferably of from 30 to 35% by weight;
c) branched-structure block copolymers in an amount comprised within the range of from 20% to 40% by weight, preferably of from 20 to 35% by weight;
with the total percent contents of said three components equating one hundred %.

Usually, the block copolymers do not have high enough adhesive properties to be used alone. Therefore, tackifier resins compatible with the elastomeric block of the conjugated diene have to be added.

A very widely used resin in such formulations is a diene-olefin piperylene:methyl-2-butene copolymer with a softening point of about 95° C.

The above said resin is commercially available under the trade marks "Wingtack 95" or "Piccotac 95".

Other resins of the same type can be used as well, in which the resin copolymer comprises 20–80% by weight of piperylene, and 80–20% of 2-methyl-2-butene.

These resins usually have a softening point (ball/ring method) comprised within the range of from about 80° to about 115° C. Mixtures of resins with high and low softening points can be used as well.

Other tackifier resins which are useful in the composition according to the present invention comprise hydrogenated resins, resin esters, polyterpenes, terpene-phenol resins, polymerized mixed olefins.

The amount of tackifier resin contained in the formulations of the present invention is comprised within the range of from 50 to 200 parts per 100 parts of rubber (phr), preferably of from 50 to 150 phr.

The adhesive formulations of the present invention may optionally contain also fluidifier substances. Among these, the liquid polyterpenic resins can be mentioned, e.g., that resin which is known on the market with the trade mark "Wingtack 10", having a softening point of about 10° C. Still other liquid resins which are useful in the adhesive formulation of the present invention are aliphatic resins, aliphatic hydrocarbon resins, from rosin esters, or tall oil. These fluidifier resins are contained in amounts comprised within the range of from about 10 to about 100 phr, preferably of from 20 to 80 phr.

The adhesive compositions according to the present invention can furthermore contain plasticizers, e.g., extender oils. Usually, said oils are well known for those skilled in the art and comprise both those oil kinds with a large content of saturated species and a large content of aromatics; naphthenic or naphthenic/paraffinic oils; butene telomers. The above said extender oils can be present in amounts comprised within the range of from 10 to 100 phr (parts per 100 parts of rubber by weight), preferably of from 20 to 60 phr.

Optionally, also arene-compatible block resins can be used. The compatibility is judged according to that method which is disclosed in U.S. Pat. No. 3,917,607. Normally, this resin should display a higher softening point than about 100° C., as determined according to ASTM E28. Also mixtures of arene-compatible resins having high and low softening points can be used. Examples of such resins are indene-coumarone resins, polystyrene resins, toluene-α-methyl-styrene copolymers and polyindene resins. More preferred is indene-coumarone resin. The amount of resin compatible with the arenic block is comprised within the range of from about 10 to about 200 phr.

The adhesive compositions according to the present invention can be modified with other materials among which pigments, fillers and the like, besides stabilizers and oxidation inhibitors, can be reminded here. Usually, stabilizers and oxidation inhibitors are added to the polymeric composition in order to prevent the polymers from undergoing degradation during preparation and use of adhesive composition. Owing to the different degradation mechanisms displayed by different polymers, antioxidant combinations are often more effective than single antioxidants. Among most known antioxidants, we remind here the hindered phenols, organometallic compounds, aromatic amines and sulfur containing compounds. The following are particularly effective:

(a) benzothiazoles, e.g., 2-(dialkyl-hydroxybenzylthio) benzothiazoles;
(b) esters of hydroxybenzyl alcohols, as 3,5-dialkyl-1-hydroxybenzyl alcohol benzoates, phthalates, stearates, adipates or acrylates;
(c) tin phenyl catecholates;
(d) zinc dialkyl dithiocarbonates;
(e) alkyl phenols, e.g., 2,6-di-t-butyl-4-methyl phenol;
(f) dilauroylthio-dipropionate.

Examples of commercially available antioxidants are:
"Ionox 220", i.e., 4,4-methylene-bis-(2,6-di-t-butylphenol);
"Ionox 330", i.e., 3,4,6-tris(3,5-di-t-butyl-p-hydroxybenzyl)-1,3,5-trimethylbenzene;
"Dalpac 4C", i.e., 2,6-di-(t-butyl)-p-cresol;
"Naugawhite", i.e., alkylated bis-phenol;
"Butyl Zimate", i.e., zinc dibutyl dithiocarbamate;
"Agerite Geltrol", i.e., alkylated-arylated bisphenol phosphite;
"Irganox 1010", i.e., a t-butyl hydroxyphenyl propionate; and
"Irganox 565", i.e., a thiotriazine derivative.

In general, the hot-melt adhesive composition contains one or more antioxidants in amounts comprised within the range of from about 0.01 to about 5.0% by weight.

The adhesive compositions of the present invention can be prepared by mixing in a solvent (e.g., toluene), the block copolymers, the tackifier resin and fluidifier substances such as, e.g., liquid resin, and stripping off the solvent; according to an alternative route, the above said composition can be prepared by simply high-temperature blending the components, e.g., at about 150° C. (hot melt).

A preferred use of the polymeric composition according to the present invention is in the preparation of pressure-sensitive adhesive tapes (PSA: "pressure-sensitive adhesives") according to methods known from technical literature, e.g., according to as disclosed in U.S. Pat. No. 3,676,202, or in label preparation.

The pressure sensitive adhesive tapes and labels are constituted by a flexible backing sheet and a layer of pressure sensitive adhesive composition according to the present invention, coated on one of the main faces of the backing sheet. The latter can be a web of plastic material, paper or any other suitable materials, and the tape may comprise several other layers or coatings, such as primers, release coatings, and the like.

The following examples are reported in order to better illustrate the present invention.

EXAMPLE 1

An amount of 700 g of cyclohexane containing 100 ppm of tetrahydrofuran and 17 g of styrene are fed to a 2-litres stainless steel reactor provided with temperature control jacket and with all the necessary fittings for introducing the ingredients.

The mixture is heated up to a temperature of 50° C. and to it 0.046 g of n-butyl lithium in n-hexane is added. After a 25-minute reaction, the temperature is increased up to 55° C. A sample is collected in order to verify that styrene has undergone complete conversion, and then 83 g of isoprene is added and the reaction is allowed to proceed during a further 20 minutes, until the second monomer has undergone complete conversion. The temperature of the end mixture results to be of approximately 90° C.

In that way, a living polymer is obtained which consists of two styrene-isoprene blocks (S—I), which is submitted to coupling reaction with monobromoethane to yield a linear polymer with two simmetrical arms, and a non-coupled polymer fraction, variable according to the added monobromoethane amount, generally within the range of from 30 to 60%.

For that purpose, 0.078 g of monobromoethane is added at 90° C., to the block copolymer containing solution, with the reaction being allowed to proceed during approximately 15 minutes.

The polymeric solution is discharged from the reactor and to it Irganox 565 (0.05 g) and TNPP, i.e., trinonyl phosphite (0.5 g) antioxidants are added.

The solvent is then removed by steam distillation and the residual linear copolymer, as clumps, is dried during 3 hours in a vacuum oven at about 60° C. The molecular weight analysis carried out by GPC (gel permeation chromatography) in tetrahydrofuran at 25° C. shows that the resulting product is a copolymer having a weight average molecular weight of 256,000 ($M_w$), which is constituted as follows:

(a) 137,000 (Mpeak) of non-coupled S—I fraction, in an amount of 45%, (b) 260,000 (Mpeak) of coupled (S—I)$_2$—X fraction in an amount of 30%, (c) a fraction of 386,000 (Mpeak), constituted by (S—I)$_3$—X and traces of higher compounds, in an amount of 25%.

The molecular weight of the polystyrenic block, also measured via GPC, resulted to be of 23,000 u.m.a.. Linear polystyrene content was of 17% by weight. Such a value was determined by Fourier Transform Infrared Analysis (FT-IR).

The coupling efficiency (C.E.) is given by the relationship:

$$[(S—I)_2+(S—I)_3+(S—I)_n]/A_{tot.}$$

wherein $A_{tot.}$ is total area. In this case, the coupling efficiency is of approximately 53%.

EXAMPLE 2

By using the same procedure as disclosed in Example 1, 16 g of styrene is polymerized using 0.11 g of n-butyl lithium in solution in n-hexane, followed by the addition of 84 g of isoprene. The resulting polymer is then coupled by means of the addition of 0.18 g of monobromoethane.

The polymer is constituted by a peak at 57,000 (Mpeak) of non-coupled S—I fraction in an amount of 36%, 115,000 (Mpeak) of coupled fraction (S—I)$_2$—X in an amount of 30%, and a 168,000 (Mpeak) fraction constituted by (S—I)$_3$—X and higher radial species, in an amount of 34%. The flow characteristics set forth an MF value=6.

EXAMPLE 3

The polymerization procedure is identical to as disclosed in the preceding examples, but in this case the coupling reaction is initiated not on isoprene (as seen in the preceding examples), but on butadiene.

To 17 g of styrene monomer, 0.04 g of n-butyl lithium is added at the temperature of 50° C. After a 25-minute reaction, after the completeness of the same reaction being checked, 83 g of butadiene is added and the reaction is allowed to proceed for a further 25 minutes, until the reaction is complete. The end temperature is of approximately 90° C. Then, 0.065 g of monobromo-ethane is added, and the reaction is allowed to proceed for a further 15 minutes. The sample drying and analysis procedure is the same as disclosed hereinabove.

EXAMPLE 4

An amount of 700 g of cyclohexane containing 100 ppm of tetrahydrofuran and 9 g of isoprene are fed to a 2-litre stainless steel reactor equipped with temperature control jacket and with all the necessary fittings for introducing the ingredients.

The resulting mixture is then heated up to a temperature of 45° C. and to it 0.046 g of n-butyl lithium in n-hexane is added. After a 20-minute reaction, the temperature is increased up to 58° C. A sample is collected in order to verify that isoprene has undergone complete conversion, and then 17 g of styrene is added and the reaction is allowed to proceed during a further 20 minutes, until the second monomer has undergone complete conversion too. The temperature of the end mixture results to be of approximately 63° C. In that way, a living diblock isoprene-styrene polymer (I—S) is obtained. In the third reaction step isoprene is added in an amount of 74 g, with the living triblock copolymer of (I$_1$—S—I$_2$) type being obtained which is submitted to coupling with monobromoethane.

For that purpose, to the block copolymer containing solution 0.078 g of monobromoethane is added at 90° C., with the reaction being allowed to proceed for approximately 15 minutes.

To the resulting polymeric solution Irganox 565 (0.05 g) and TNPP (0.5 g) antioxidants are added.

The solvent is then removed by steam distillation and the residual linear copolymer, in clump form, is dried for 3 hours in a vacuum oven at about 60° C.

The GPC analysis in tetrahydrofuran at 25° C. shows that the resulting product is a copolymer having a weight average molecular weight of 260,000 ($M_w$), which is constituted as follows:

(a) 137,000 (Mpeak) of non-coupled I$_1$—S—I$_2$ fraction, in an amount of 45%, (b) 270,000 (Mpeak) of coupled (I$_1$—S—I$_2$)$_2$—X fraction in an amount of 30%, (c) a fraction of 386,000 (Mpeak), constituted by (I$_1$—S—I$_2$)$_3$—X and traces of higher compounds, in an amount of 25%.

The molecular weight of the polystyrenic block, also measured via GPC, resulted to be of 23,000 u.m.a.. The total polystyrene level in linear copolymer is of 17% by weight. Such a value was determined by Fourier Transform Infrared Analysis.

EXAMPLE 5

To the same reactor as used in Example 4, 700 g of cyclohexane containing 100 ppm of THF and 9 g of butadiene are charged.

The mixture is then heated up to a temperature of 45° C. and to it 0.06 g of n-butyl lithium in solution in n-hexane is added.

After a 20-minute reaction, the temperature is increased up to 58° C. A sample is collected in order to verify that butadiene monomer has undergone complete conversion, and then 17 g of styrene is added and the reaction is allowed to proceed for a further 20 minutes, until the second monomer has undergone complete conversion too. The temperature of the end mixture results to be of approximately 63° C.

In that way, a living diblock butadiene-styrene polymer (B—S) is obtained. In the third reaction step butadiene is added in an amount of 74 g, with the living triblock copolymer of (B$_1$—S—B$_2$) type being obtained which is then submitted to the coupling reaction with monobromoethane, in order to originate a polymer with two simmetrical arms, and a variable content of non-coupable polymer fraction as a function of monobromoethane amount, comprised within the range of from 30 to 60%.

For that purpose, 0.10 g of monobromoethane is added to the block copolymer containing solution, at 65° C., and the reaction is allowed to proceed for approximately 15 minutes.

The resulting polymeric solution is discharged from the reactor and to it Irganox 565 (0.05 g) and TNPP (0.5 g) antioxidants are added. The solvent is then removed by steam distillation and the residual linear copolymer, in clump form, is dried for 3 hours in a vacuum oven at about 60° C.

The analysis of molecular weights by GPC in THF shows that the resulting product is a copolymer having a weight average molecular weight of 194,000 ($M_w$), which is constituted as follows:

(a) 107,000 (Mpeak) of non-coupled $B_1$—S—$B_2$ fraction, in an amount of 46%, (b) 210,000 (Mpeak) of coupled $(B_1$—S—$B_2)_2$—X fraction in an amount of 30%, (c) a fraction of 386,000 (Mpeak), constituted by $(B_1$—S—$B_2)_3$—X and traces of higher compounds, in an amount of 24%.

The molecular weight of the polystyrenic block, also measured via GPC, resulted to be of 18,000 u.m.a.. The total content of polystyrene in linear copolymer is of 17% by weight. Such a value was determined by Fourier Transform Infrared Analysis (FT-IR).

EXAMPLE 6

To the same reactor as used in Example 4, 700 g of cyclohexane containing 30 ppm of THF and a mixture constituted by 9 g of isoprene and 18 g of styrene are charged.

The mixture is then heated up to a temperature of 45° C. and to it 0.053 g of n-butyl lithium in solution in hexane is added. After a 30-minute reaction, the temperature is increased up to 60° C. A sample is collected in order to verify that all monomers have undergone complete conversion, and then 73 g of isoprene is added and the reaction is allowed to proceed for a further 30 minutes, until the second monomer has undergone complete conversion too.

The temperature of the end mixture results to be of approximately 87° C. In that way, a living polymer "A" is obtained, which is constituted by a polyisoprenic block followed by a variously disturbed isoprene-styrene region, and an end polystyrene block having a structure of (ITS) type. In the third reaction step isoprene is added in an amount of 73 g, with a living block copolymer of $(I_1$—TS—$I_2)$ type being obtained which is submitted to the coupling reaction with monobromoethane, in order to originate a linear polymer with two simmetrical arms of $(I_1$—TS—$I_2)_2$—X type, and a variable content of non-coupable polymer fraction as a function of monobromoethane amount, comprised within the range of from 30 to 60%.

For that purpose, 0.09 g of monobromoethane is added to the copolymer containing solution at 90° C. and the reaction is allowed to proceed for about 15 minutes.

The resulting polymeric solution is discharged from the reactor and to it Irganox 565 (0.05 g) and TNPP (0.5 g) antioxidants are added. The solvent is then removed by steam distillation and the residual linear copolymer, in clump form, is dried for 3 hours in a vacuum oven at about 60° C.

The analysis of molecular weights by GPC in tetrahydrofuran at 25° C. shows that the resulting product is a copolymer having a weight average molecular weight of 225,000 ($M_w$), which is constituted as follows:

(a) 120,000 (Mpeak) of non-coupled $I_1TS$—$I_2$ fraction, in an amount of 45%, (b) 238,000 (Mpeak) of coupled $(I_1TS$—$I_2)_2$—X fraction in an amount of 30%, (c) a fraction of 358,000 (Mpeak), constituted by $(I_1TS$—$I_2)_3$—X and traces of higher compounds, in an amount of 25%.

The molecular weight of the polystyrenic block, also measured via GPC, resulted to be of 21,000 u.m.a.. The total polystyrene content in linear copolymer is of 18% by weight, with a content of polystyrene blocks of round 9–10%. Such a value was determined by analysis based on heat degradation with osmium tetroxide ($OsO_4$).

EXAMPLE 7

To the same reactor as used in Example 4, 700 g of cyclohexane containing 30 ppm of tetrahydrofuran and a mixture constituted by 9 g of butadiene and 18 g of styrene are charged.

The mixture is then heated up to a temperature of 45° C. and to it 0.053 g of n-butyl lithium in solution in n-hexane is added. After a 30-minute reaction, the temperature is increased up to 60° C. A sample is collected in order to verify that styrene and butadiene have undergone complete conversion, and then 73 g of butadiene is added and the reaction is allowed to proceed for a further 30 minutes, until the second monomer has undergone complete conversion too. The temperature of the end mixture results to be of approximately 87° C.

In that way, a living polymer is obtained, which is constituted by a polybutadienic block followed by a variously disturbed butadiene-styrene region, and an end polystyrene block having a structure of (BTS) type. In the third reaction step butadiene is added in an amount of 73 g, with a living block copolymer of $(B_1TS$—$B_2)$ type being obtained which is submitted to the coupling reaction with monobromoethane in order to originate a linear polymer with two simmetrical arms of $(B_1TS$—$B_2)_2$—X type, and a variable amount of non-coupable polymer fraction as a function of monobromoethane amount, comprised within the range of from 30 to 60%

For that purpose, 0.09 g of monobromoethane is added to the block copolymer containing solution at 90° C. and the reaction is allowed to proceed for approximately 15 minutes.

The polymeric solution is discharged from the reactor and to it Irganox 565 (0.05 g) and TNPP (0.5 g) oxidants are added.

The solvent is then removed by steam distillation and the residual linear copolymer, in clump form, is dried for 3 hours in a vacuum oven at about 60° C.

The analysis of molecular weights by GPC in THF at 25° C. shows that the resulting product is a copolymer having a weight average molecular weight of 225,000 ($M_w$), which is constituted as follows:

(a) 120,000 (Mpeak) of non-coupled $B_1TS$—$B_2$ fraction, in an amount of 45% by weight, (b) 238,000 (Mpeak) of coupled $(B_1TS$—$B_2)_2$—X fraction in an amount of 30%, (c) a fraction of 358,000, constituted by $(B_1TS$—$B_2)_3$—X in an amount of 25%.

The molecular weight of the polystyrenic block, also measured via GPC, resulted to be of 23,000 u.m.a.. The total polystyrene content in linear copolymer is of 18% by weight, with a content of polystyrene blocks of round 9–10%. Such a value was determined by analysis based on heat degradation with osmium tetroxide.

CHARACTERIZATION OF POLYMERIC COMPOSITIONS

Some formulations comprising the polymeric compositions reported in above Examples 2, 4 and 5 are characterized for their suitability of use as adhesives for labels. For comparison purposes, formulations were prepared which contained a commercial polymer commonly used in the field of label manufacture, constituted by a coupled structure of (SI)$_2$—X type and a non-coupled SI structure with a coupling efficiency of 60% and a polystyrene content of 15%. The total average molecular weight (M$_w$) resulted to be of 135,000 with a molecular weight of non-coupled fraction of 87,000.

Several standard Test Procedures are used to measure the adhesion and cohesion characteristics of the adhesive compositions.

The most known ones from these Test Procedures are:

(a) Rolling Ball Tack, Pressure Sensitive Tape Council (PSTC) PSTC Method No. 6;
(b) Polyken Probe Tack, ASTM D-2979;
(c) 180° Peel Adhesion, PSTC Method No. 1;
(d) Quick Stick to Steel, PSTC Method No. 5;
(e) Holding Power to Steel, PSTC Method No. 7.

The polymeric compositions according to the present invention were prepared by the "hot melt" technology, by blending the polymeric composition with various amounts of tackifier resin (Wingtack 95) and liquid resin (Wingtack 10). The resulting formulations were stabilized by adding Irganox 565 and Irganox 1010 ex Ciba-Geigy.

In order to measure the adhesion and cohesion characteristics, the following standard Test Procedures were used:

180° Peel Adhesion, which is used in order to measure the adhesion capability on steel and polyethylene by peeling at 180°. The result from said measurement, carried out according to the standard PSTC 1 Test Procedure, is expressed as N/2.5 cm;

Polyken Tack, which measures the adhesive capability. The result from said measurement, carried out according to ASTM D 2979/71, is expressed as g;

Quick stick, which is used in order to measure the adhesion capability on steel and polyethylene by peeling at 90°. The result from said measurement, carried out according to the standard PSTC 5 Test Procedure, is expressed as N/2.5 cm;

Holding Power, which measures the cohesive capability, as measured on steel. The result from said measurement, carried out according to the standard PSTC 7 Test Procedure, is expressed as hours.

In order to evaluate the polymeric compositions of the present invention, two formulations were prepared, designated as "A" and "B", respectively.

The "A" formulation is constituted by 100 parts of polymer, 130 parts by weight of Wingtack 95 per 100 parts of polymer (phr), 40 phr of Wingtack 10 and 1 phr of stabilizer.

The "B" formulation is constituted by 100 parts of polymer, 130 phr of Wingtack 95, 60 phr of Wingtack 10 and 1 phr of stabilizer.

The properties of the above said formulates are reported in Tables 1 and 2, respectively.

In the above said Tables, the viscosity of the molten material at 160° C. was measured after formulate ageing for 24 and 48 hours in air at 180° C.

As to the "Holding Power" measurement, it was carried out with a contact surface area of 1 square inch and under a weight of 1 kg.

TABLE 1

("A" Formulate)

| Property | Example 2 | Example 4 | Example 5 | Comparison Example |
|---|---|---|---|---|
| Melt Viscosity (mPa · s): | | | | |
| 160° C. | 39.0 | 30.0 | 20.1 | 31.2 |
| 24 h at 180° C. | 23.4 | 17.9 | 12.4 | 9.4 |
| 48 h at 180° C. | 15.6 | 12.2 | 8.3 | 4.5 |
| 180° Peel Adhesion (N/2.5 cm): | | | | |
| On steel | 25.7* | 27.2* | 26.8* | 25.6* |
| On PE | 16.2 | 16.8 | 21.4 | 16.3 |
| Quick Stick (N/2.5 cm): | | | | |
| On steel | 10.4 | 11.6 | 10.9 | 9.8 |
| On PE | 7.2 | 7.9 | 9.1 | 6.2 |
| Polyken Tack (g): | 870 | 890 | 910 | 951 |
| Holding Power (h): On steel, at 50° C. | 26 | 25 | 26 | 23 |

* = Cohesive failure

TABLE 2

("B" Formulate)

| Property | Example 2 | Example 4 | Example 5 | Comparison Example |
|---|---|---|---|---|
| Melt Viscosity (mPa · s): | | | | |
| 160° C. | 30.0 | 23.0 | 17.8 | 24.0 |
| 24 h at 180° C. | 18.0 | 13.8 | 10.7 | 7.5 |
| 48 h at 180° C. | 12.0 | 9.2 | 7.2 | 3.4 |
| 180° Peel Adhesion (N/2.5 cm): | | | | |
| On steel | 26.8* | 29.8* | 28* | 27.0* |
| On PE | 17.6 | 18.6 | 23.5 | 18.0 |
| Quick Stick (N/2.5 cm): | | | | |
| On steel | 12.8 | 13.5 | 12.9 | 12.6 |
| On PE | 8.4 | 8.5 | 10.1 | 7.0 |
| Polyken Tack (g): | 922 | 940 | 980 | 969 |
| Holding Power (h): On steel, at 50° C. | 24.0 | 23.0 | 24.0 | 22.0 |

* = Cohesive failure

From the data reported in Tables 1 and 2, one will see that the formulations containing the polymeric compositions according to the present invention (Examples 2, 4 and 5) display adhesion and cohesion properties which are similar to those displayed by compositions formulated from the comparison polymer. As compared to the formulations obtained from the latter polymer, the compositions according to the present invention display the advantage of a high oxidation resistance. This property is evidenced in the Tables in terms of melt viscosity.

The decrease in viscosity after accelerated ageing at 180° C. for 24 and 48 hours is much lower for formulations containing the polymeric compositions of the present invention, as compared to those formulations which contain the comparison polymer.

Owing to the correlation between decrease in viscosity and formation of de-coupled polymer "AB" (with the latter lacking cohesion properties), a higher viscosity stability after accelerated ageing leads to a better retention of balanced values of cohesion properties and adhesion properties.

From an application viewpoint, more stable viscosity values result in a better reproducibility of end technological characteristics. By contrast, an easy degradability of the polymer and, hence, of formulate, causes an unbalance in end properties, with an increase in tack to damage of cohesion. Such an increase in tack will lead to cutting problems to be met during the die cutting operation, during end manufactured article (labels) processing.

The oxidation resistance of the polymeric compositions mentioned in Examples 2, 4, 5, as well as of comparison polymer was evaluated by measuring the yellow index after a 4-hour ageing in an air oven at 150° C.

The measurement was carried out according to the standard ISO R 457 Test Procedure, using a Datacolor Elephro 2000 Instrument, Lighting Unit D65 at 10°. The results are reported in following Table 3.

TABLE 3

| Property | Example 2 | Example 4 | Example 5 | Comparison Example |
|---|---|---|---|---|
| Yellow index | 46.04 | 44.76 | 45.00 | 95.12 |

From above Table 3, one will clearly see that the polymeric compositions according to the present invention undergo a lesser yellowing than the comparison polymer.

We claim:

1. A block copolymer composition prepared by copolymerizing a monoalkenyl-arene and a conjugated diene having from 4 to 5 carbon atoms, comprising:
   (a) a linear, non-coupled block copolymer of the formula A—B, in an amount comprised within the range of from 30 to 55% by weight;
   (b) a linear, coupled block copolymer of the formula (A—B)$_n$—X, (B$_1$—A—B$_2$)—X, and (B$_1$TA—B$_2$)$_n$—X where n=2, in an amount comprised within the range of from 25% to 40% by weight; and
   (c) a branched, coupled block copolymer of the formula (A—B)$_n$—X, (B$_1$—A—B$_2$)$_n$—X, and (B$_1$TA—B$_2$)$_n$—X wherein n≧3 and in an amount comprised within the range of from 20% to 40% by weight;

wherein A is a polymer block of said monoalkenyl-arene, B is a polymer block of said conjugated diene, T is a random copolymer segment of said monoalkenyl-arene and said conjugated diene, and X in (b) and (c) is an organic radical derived from coupling agents selected from monobromo-derivatives having the formula R$_1$—Br in which R$_1$ is a monofunctional C$_1$–C$_{10}$ hydrocarbyl radical selected from the group consisting of alkyl, cycloalkyl and aryl radicals, and wherein the total percent of said (a), (b) and (c) is equal to one hundred %.

2. A composition according to claim 1, comprising:
   said component (a) in an amount comprised with the range of from 35% to 50% by weight;
   said component (b) in an amount comprised within the range of from 30% to 35% by weight; and
   said component (c) in an amount comprised within the range of from 20% to 35% by weight.

3. A composition according to claim 1, characterized in that the conjugated diene having from 4 to 5 carbon atoms is selected from the group consisting of isoprene and butadiene.

4. A composition according to claim 1, characterized in that said monoalkenyl-arene is styrene.

5. A composition according to claim 1, characterized in that the weight average molecular weight of said composition is comprised within the range of from 100,000 to 200,000.

6. A composition according to claim 1, characterized in that the total content of poly-(monoalkenyl arene) is comprised within the range of from 8% to 40% by weight.

7. A composition according to claim 6, characterized in that the total content of poly-(monoalkenyl arene) is comprised within the range of from 10% to 25% by weight.

8. A process for preparing block copolymers according to claim 1, the process comprising the following steps:
   (a) reacting a monoalkenyl-arene with a lithium derivative having the formula R—Li, in which R is a hydrocarbyl radical selected from the group consisting of aliphatic and cycloaliphatic radicals of from 2 to 20 carbon atoms;
   (b) reacting the resulting mixture from step a with the conjugated diene;
   (c) reacting the resulting mixture from step b with a coupling agent in an essentially stoichiometric amount based on lithium, characterized in that the coupling agent of step c is a monobromo-derivative having the formula R'—Br, in which R' is a monofunctional C$_1$–C$_{10}$ hydrocarbyl radical selected from the group consisting of alkyl, cycloalkyl and aryl radicals.

9. Process according to claim 8, characterized in that R' is selected from C$_1$–C$_3$ alkyl radicals.

10. Process according to claim 9, characterized in that R' is ethyl.

11. Process according to claim 8, characterized in that in the (c) step, temperature is comprised within the range of from 70° to 100° C.

12. An adhesive composition for preparing adhesive tapes and labels, comprising a base polymer, one or more tackifier resins and, optionally, one or more antioxidants and a fluidifier resin and/or a fluidifier oil, characterized in that said base polymer is a composition of block copolymers derived from the copolymerization of a monoalkenyl-arene and a conjugated diene having from 4 to 5 carbon atoms, with the above said copolymer composition consisting essentially of:
   (a) a linear, non-coupled block copolymer of the formula A—B in an amount comprised within the range of from 30% to 55% by weight;
   (b) a linear, coupled block copolymer of the formula (A—B)$_n$—X, (B$_1$—A—B$_2$)—X, and (B$_1$TA—B$_2$)$_n$—X where n=2, in an amount comprised within the range of from 25% to 40% by weight; and
   (c) a branched, coupled block copolymer of the formula (A—B)$_n$—X, (B$_1$—A—B$_2$)$_n$—X, and (B$_1$TA—B$_2$)$_n$—X wherein n≧3 and in an amount comprised within the range of from 20% to 40% by weight;

wherein A is a polymer block of said monoalkenyl-arene, B is a polymer block of said conjugated diene, T is a random copolymer segment of said monoalkenyl-arene and said conjugated diene, and X in (b) and (c) is an organic radical derived from coupling agents selected from monobromo-derivatives having the formula $R_1$—Br in which $R_1$ is a monofunctional $C_1$–$C_{10}$ hydrocarbyl radical selected from the group consisting of alkyl, cycloalkyl and aryl radicals, and wherein the total percent of said (a), (b) and (c) is equal to one hundred %.

13. An adhesive composition according to claim 12, characterized in that said copolymer composition consists essentially of:

said component a in an amount comprised within the range of from 35% to 50% by weight;

said component b in an amount comprised within the range of from 30% to 35% by weight; and said component c in an amount comprised within the range of from 20% to 35% by weight.

14. Adhesive composition according to claim 12, characterized in that said monoalkenyl-arene is styrene.

15. Adhesive composition, a+b+c according to claim 12, characterized in that the weight average molecular weight of the polymeric composition is comprised within the range of from 100,000 to 400,000.

16. Adhesive composition according to claim 12, characterized in that the total content of poly(monoalkenyl arene) present in a+b+c is comprised within the range of from 8 to 40% by weight.

17. Adhesive composition according to claim 16, characterized in that the total content of poly(monoalkenyl arene) present in a+b+c is comprised within the range of from 10 to 25% by weight.

18. Adhesive composition according to claim 12, characterized in that it contains from 50 to 200 parts of the one or more tackifier resins per 100 parts of base polymer composition (phr), from 10 to 100 phr of one or more fluidifier resins and, optionally, an amount of from 10 to 100 phr of the fluidifier oil.

19. Adhesive composition according to claim 18, characterized in that it comprises said one or more tackifier resins in an amount comprised within the range of from 50 to 150 phr, said fluidifier resin in an amount comprised within the range of from 20 to 80 phr, and said fluidifier oil in an amount comprised within the range of from 20 to 60 phr.

* * * * *